United States Patent
Niem

(10) Patent No.: US 9,193,356 B2
(45) Date of Patent: Nov. 24, 2015

(54) LANE MONITORING METHOD AND LANE MONITORING SYSTEM FOR A VEHICLE

(75) Inventor: Wolfgang Niem, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 388 days.

(21) Appl. No.: 13/593,810

(22) Filed: Aug. 24, 2012

(65) Prior Publication Data

US 2013/0063595 A1 Mar. 14, 2013

(30) Foreign Application Priority Data

Aug. 31, 2011 (DE) .......................... 10 2011 081 892

(51) Int. Cl.
| | |
|---|---|
| *H04N 7/18* | (2006.01) |
| *B60W 30/12* | (2006.01) |
| *B62D 15/02* | (2006.01) |
| *B60W 30/18* | (2012.01) |
| *B60W 50/10* | (2012.01) |

(52) U.S. Cl.
CPC ......... *B60W 30/12* (2013.01); *B60W 30/18145* (2013.01); *B60W 30/18163* (2013.01); *B62D 15/025* (2013.01); *B62D 15/029* (2013.01); *B60W 50/10* (2013.01); *B60W 2420/42* (2013.01); *B60W 2520/10* (2013.01); *B60W 2520/125* (2013.01); *B60W 2520/14* (2013.01); *B60W 2540/18* (2013.01); *B60W 2550/146* (2013.01); *B60W 2550/148* (2013.01); *B60W 2550/402* (2013.01)

(58) Field of Classification Search
CPC ......... B60T 2201/08; B60T 2201/087; B60W 2420/403; B60W 2501/20; B60W 10/20; B60W 50/14

USPC .......... 348/118, 119, 148; 340/435–438, 465, 340/901; 701/41–44, 116, 300, 301
See application file for complete search history.

(56) References Cited

U.S. PATENT DOCUMENTS

| | | | |
|---|---|---|---|
| 6,792,345 B2* | 9/2004 | Matsumoto et al. ............ 701/96 |
| 6,850,628 B2* | 2/2005 | Shirato ........................ 382/104 |
| 6,853,884 B2* | 2/2005 | Sadano ............................. 701/1 |
| 7,091,838 B2* | 8/2006 | Shimakage ................... 340/436 |
| 7,216,023 B2* | 5/2007 | Akita .............................. 701/41 |
| 7,400,236 B2 | 7/2008 | Kade et al. |
| 8,423,246 B2* | 4/2013 | Takeda et al. .................. 701/41 |
| 2006/0030987 A1* | 2/2006 | Akita .............................. 701/41 |
| 2007/0164852 A1* | 7/2007 | Litkouhi ....................... 340/435 |

(Continued)

FOREIGN PATENT DOCUMENTS

| | | |
|---|---|---|
| DE | 195 07 957 | 3/1995 |
| DE | 199 37 489 | 2/2001 |
| DE | 10 2005 018 | 12/2005 |

(Continued)

*Primary Examiner* — Victor Kostak
(74) *Attorney, Agent, or Firm* — Kenyon & Kenyon LLP

(57) ABSTRACT

A lane monitoring method for a vehicle includes: detecting a lane of the vehicle with the aid of a camera of the vehicle; recording driving status measuring signals of the vehicle; evaluating the driving status of the vehicle according to at least one lane departure criterion; upon meeting the lane departure criterion, checking whether decision criteria for detecting an intentional trajectory shortening maneuver have been met; and generating a lane departure warning signal as a function of the evaluation according to the lane departure criterion, the output of the lane departure warning signal being suppressed if an intentional trajectory shortening maneuver is detected.

17 Claims, 3 Drawing Sheets

(56) References Cited

U.S. PATENT DOCUMENTS

| | | | |
|---|---|---|---|
| 2007/0233343 A1* | 10/2007 | Saito et al. | 701/41 |
| 2008/0047775 A1* | 2/2008 | Yamazaki | 180/443 |
| 2008/0091318 A1* | 4/2008 | Deng et al. | 701/41 |
| 2009/0024279 A1* | 1/2009 | Takeda et al. | 701/41 |
| 2010/0191421 A1* | 7/2010 | Nilsson | 701/41 |
| 2011/0103650 A1* | 5/2011 | Cheng et al. | 382/104 |
| 2011/0115615 A1* | 5/2011 | Luo et al. | 340/436 |

FOREIGN PATENT DOCUMENTS

| | | |
|---|---|---|
| DE | 10 2004 026 | 1/2006 |
| DE | 10 2009 022 | 11/2010 |
| EP | 1 225 424 | 7/2002 |
| EP | 1 422 111 | 5/2004 |

\* cited by examiner

LANE MONITORING METHOD AND LANE MONITORING SYSTEM FOR A VEHICLE

BACKGROUND OF THE INVENTION

1. Field of the Invention

The present invention relates to a device and method for providing lane monitoring for a vehicle during driving.

2. Description of the Related Art

A lane departure warning (LDW) system provides a driver assistance function which performs a check during driving of whether the vehicle is remaining within the present lane or is about to depart from the lane. For this purpose, limit lines on the sides of the lane are detected by one or multiple cameras of the vehicle.

Published German patent documents DE 195 07 957 C1 and DE 199 37 489 B4, as well as U.S. Pat. No. 7,400,236 B2, show such lane monitoring systems having a lane departure warning function. Functions of this type are typically based on the evaluation of image sequences from a forward facing camera. U.S. Pat. No. 7,400,236 B2 proposes the use of a front camera of this type and an additional rear view camera for the purpose of detecting the side lines ahead and in back.

In some LDW systems, a time to crossing the side line marking the lane is ascertained as $t_{LC}$ (time to line crossing) and compared with a threshold value for the purpose of warning the driver before the actual departure from the lane. If the time drops below this threshold value, the LDW signal is output, for example to a display device in the cockpit.

However, warning signals of this type may be distracting to the driver and divert his attention during dynamic driving operations, for example if he wishes to deliberately depart from the lane.

BRIEF SUMMARY OF THE INVENTION

The present invention is based on the idea of performing a check while departing from the lane to see whether an intentional shortening of the vehicle trajectory in a curve is occurring, which is also generally referred to as "cutting curves." On a clear roadway, a driver may, at times, not wish to fully negotiate the curves of his lane but instead may slightly cut or shorten the curve contour of his lane.

In situations of this type, outputting the LDW signal (lane departure warning signal) may be distracting or confusing. Outputting the LDW signal too frequently may possibly also cause the driver to ignore this function or to turn it off entirely, so that he may no longer be warned accordingly later on, even when unintentionally departing from the curve, e.g., due to fatigue.

To distinguish between intentional shortening of the trajectory and unintentional lane departure, relevant decision criteria are advantageously applied. If these criteria are met, an LDW signal is not output even though an LDW criterion (lane departure criterion) has been met, whereby it has been determined that a lane departure is about to occur or has already begun.

The decision criteria are advantageously aimed at determining or establishing the plausibility of the fact that a curve is located ahead of the vehicle and the driver is intentionally changing to another lane. The following decision criteria are advantageously used for this purpose:

According to a first decision criterion, a check is made of whether a curve is located ahead of the vehicle according to the map data and the present position (map-matched position) of the vehicle on this map. For this purpose, a curve radius of the route ahead of the vehicle, e.g., a route range of 20 meters to 100 meters ahead of the vehicle, is advantageously examined for a curve and checked to see whether the curve radius is below a threshold and/or whether the longitudinal extension of the curve is below a threshold. This decision criterion is intended to rule out a straight or relatively slightly curved route ahead of the vehicle.

A second decision criterion evaluates the quality of the position of the vehicle on the map or in the map data, e.g., the quality of the map-matched position of the driver's own vehicle or, if necessary, also that of the route ahead of the vehicle, in particular, the estimated quality of the ascertained curve radius. Once this quality has been achieved, an upcoming turn maneuver may be assumed with a sufficient degree of certainty. If the available map data and the global position determination are, in principle, already so good that a quality of this type is obvious, the second decision criterion may also be assumed to be inherently applicable, and it is not queried here. If necessary, the entry of an error message may be requested instead.

A third decision criterion checks on whether the driver is changing to another lane and is not departing from the roadway entirely. On a two-lane roadway, only one lane change to the other lane is thus permitted, e.g., generally to the oncoming lane. A check is thus made to see whether the lane-delimiting line which is about to be crossed or has already been crossed is an inner line of the curve. However, if an outer roadway line is crossed, the fact that a trajectory-shortening maneuver is intended may be ruled out. The third decision criterion may be ascertained, in principle, from the camera signals and map data; on a two-lane roadway and with right-hand traffic, the criterion may also be ascertained from the direction of transverse acceleration or the sign of the yaw rate.

A fourth decision criterion checks whether the driver is actively steering. This is based on the idea that only an intentional shortening of the trajectory (cutting curves) is to be permitted but not a shortening of the trajectory based on negligence or possibly on reduced attentiveness or sleepiness on the part of the driver. Active steering by the driver may, on the one hand, be checked on the basis of driving dynamic measuring signals of the car, in particular a steering angle signal if the vehicle has a steering angle sensor. For this purpose, a check is made of whether a steering angle is above a threshold. Additionally or alternatively, for example, the transverse acceleration of a transverse acceleration sensor may be recorded as the measuring signal, since a turn maneuver or a steering angle correspondingly results in a centrifugal force, which is measured accordingly. Additionally or alternatively to the transverse acceleration, a yaw rate sensor may also be used which thus measures the yaw rate or rotation around the vertical axis. If signals of this type are not present, for example, the vehicle velocity may be used additionally with the camera signals for the purpose of evaluating from the hereby ascertained vehicle trajectory whether active steering is taking place.

Additional decision criteria are also possible. For example, if a distance sensor or a sensor for detecting the area ahead of the vehicle is provided, a check may be made to see whether another vehicle or an interfering obstacle is located in the opposite lane which the vehicle will reach after cutting the curve and whether the LDW signal is output as a warning in this case. Additionally or alternatively, general driving dynamics characteristics or handling characteristics may also be used, in particular the traction or road grip of the wheels to the surface; in the event of excessively poor handling characteristics in which, for example, it would be difficult to suddenly return to the vehicle's own lane due to rapid steering or braking, the non-output or suppression of the output of the LDW signal may thus be canceled, if necessary, and the LDW signal may always be output when a lane departure is detected.

As a further decision criterion, it may be provided that a check of map data is made to see whether an intersection is located in a route range of, for example, 100 meters ahead of the vehicle for the purpose of not permitting the trajectory to be shortened in such a case, i.e., to output the LDW signal as a warning.

The decision criteria are thus used to suppress the output of an LDW signal even though the LDW criteria have been met.

In particular, only one rear view camera may be used as the camera, from whose camera signals the side lines of the lane may be detected, and from these side lines the vehicle's own position in the lane may be detected—in particular by affirming the rear course of the side lines toward the front, e.g., with the aid of a Kalman filter. The roadway located ahead of the vehicle may be inferred from these camera signals, together with the navigation data, e.g., the determination of the vehicle's position by a global positioning system together with map data.

The LDW system according to the present invention thus advantageously has a control unit and a camera, for example a rear view camera, which includes means for affirming the forward course of the roadway as well as, for example, a display unit for displaying the LDW signal. The control unit accesses the driving dynamics signals of the vehicle, for example via the onboard CAN bus, and advantageously also accesses navigation signals.

The lane departure warning signal, or LDW signal, may be output to a display unit to the driver as a pure warning signal and/or, if the function is an automatic lane maintaining system, it may also be output as a control signal for a driving dynamics intervention, e.g., a steering intervention and/or an asymmetrical braking intervention.

According to the present invention, in the event that an evaluation of the driving state of the vehicle according to at least one lane departure criterion has shown that a relevant behavior of the vehicle is occurring, according to which a complete or partial departure of the vehicle will soon take place or has even already begun, an additional check is carried out to see whether relevant decision criteria are present according to which the lane departure warning signal (LDW signal) will nevertheless not be output. In principle, this non-output may be regarded as suppression of the output of the lane departure warning signal.

However, the additional check of the at least one decision criterion may furthermore be regarded as part of a superordinate overall lane departure criterion, or it may form part of the overall lane departure criterion; in this case, or in this configuration, the overall lane departure criterion thus includes the lane departure criterion and also the at least one decision criteria as a resolving (negative) condition according to which the overall lane departure criterion is not met upon fulfillment of the at least one decision criterion.

DETAILED DESCRIPTION OF THE INVENTION

Figure 1:
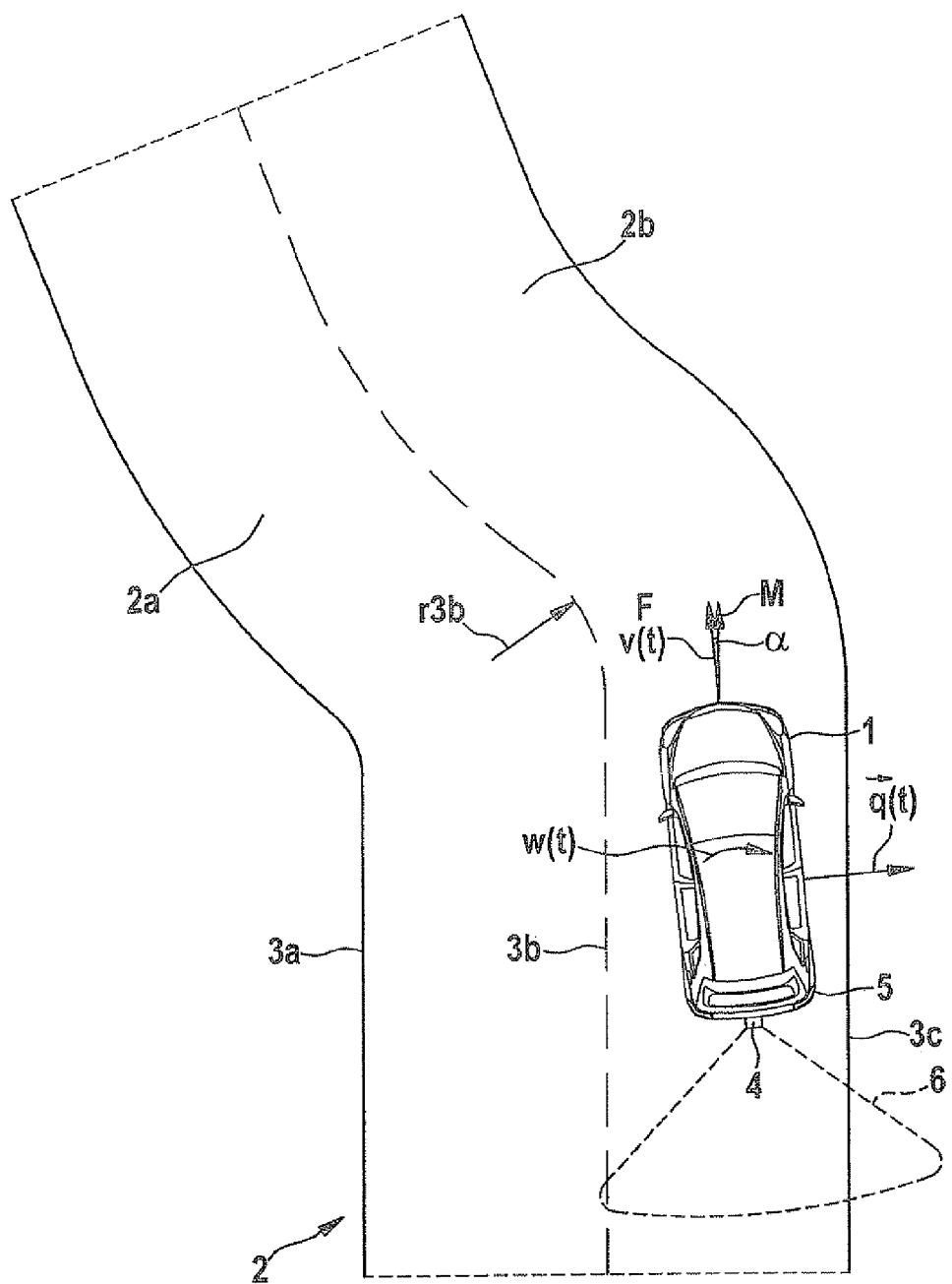
FIG. 1 shows a driving scene on a roadway in which a method according to the present invention is carried out.
Figure 2:
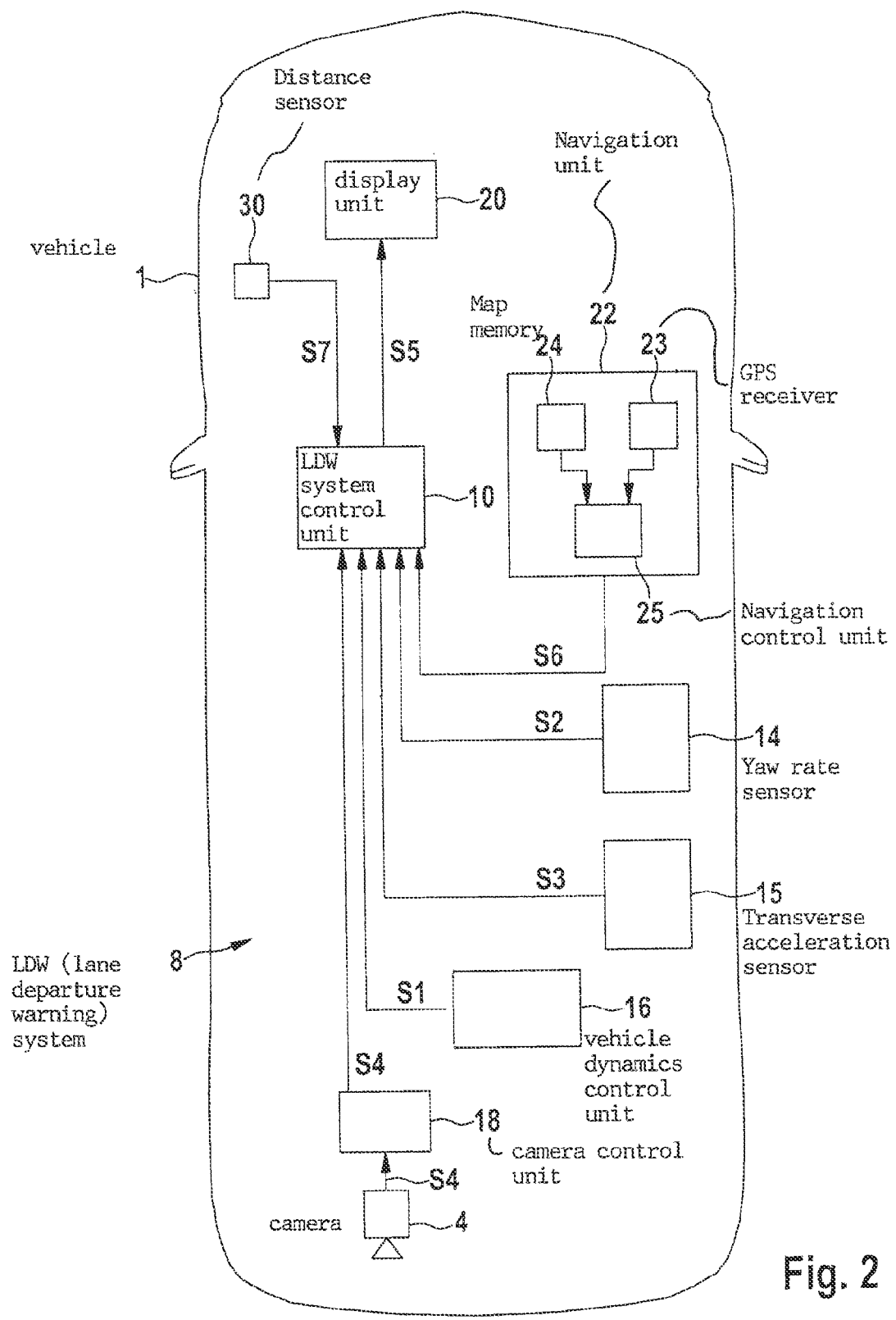
FIG. 2 shows an enlarged representation of the vehicle from FIG. 1.

A vehicle 1 is driving on a roadway 2 which has two lanes 2a, 2b; according to the right-hand traffic provided herein, vehicle 1 is thus driving in the right-hand lane 2b. Lanes 2a, 2b are delimited by roadway lines 3a, 3b, 3c, of which 3a and 3c are outer roadway lines and 3b is inner the inner roadway line for separating the two lanes 2a, 2b. As shown in FIG. 1, line 3b may have a different design, e.g., it may be dotted or dashed, or it may be identical to outer roadway lines 3a and 3c.

Vehicle 1 is driving in a driving direction F at a velocity v (t), a transverse acceleration q and a yaw rate $\omega$ (t) as well as a steering angle. Driving direction F corresponds to the direction of driving velocity v (t), so that F and v in this case are represented by the same arrow, and driving direction F is identical to lane direction M, which is defined by roadway lines 3b, 3c, during proper vehicle operation.

Vehicle 1 has a rear view camera 4, which is attached to rear 5 of vehicle 1 and which detects the rear area behind vehicle 1, possibly including side areas; detection area 6 of camera 4 advantageously includes lines 3b, 3c, which delimit its lane 2b.

Vehicle 1 has an LDW system 8 (lane departure warning system) which includes a control unit 10, which records driving status measuring signals via an onboard data bus, e.g., the CAN bus, in particular a driving velocity signal having information concerning driving velocity v, yaw rate signals S2 output by an existing yaw rate sensor 14 as well as transverse acceleration signals S3 output by a possibly existing transverse acceleration sensor 15. Driving velocity signal S1 is provided, e.g., in the form of an ABS reference velocity, by a control unit 16 of a vehicle dynamics control system, e.g., an ABS and/or ESP (electronic stability system) and/or TCS (traction control system). Signals S2 and S3 may also be initially supplied from sensors 14, 15 to control unit 16 of the vehicle dynamics control system and then made available via the CAN bus.

Camera 4 covers detection area 6 and outputs camera signals S4 (image signals), e.g., to a cameral control unit 18, which may be, for example, the control unit of a parking assistance system and/or a surroundings monitoring system, and which makes camera signals S4 or signals formed therefrom available via the CAN bus.

Control unit 10 preferably affirms and/or extrapolates from camera signals S4 the course of the side-limiting roadway lines in the forward direction.

Control unit 10 of the LDW system ascertains a departure from lane 2b as the crossing of one of the two roadway lines 3b or 3c. Control unit 10 may ascertain the crossing in advance according to a lane change display criterion K0 and output an LDW signal (lane departure signal, lane departure warning signal) S5 in the form of a warning signal to a display unit 20 for the driver and/or possibly also for a steering intervention in the case of the function of an automatic lane maintaining system.

For this purpose, control unit 10 ascertains, on the one hand, the present position of vehicle 1 in lane 2b in the transverse direction, i.e., the transverse position (contact) and the deviation of driving direction F from lane direction M (direction of the lane), which may be described, e.g., as yaw angle $\alpha = \alpha$ (t) whose time derivation is yaw rate $\omega$ (t). Control unit 10 ascertains therefrom a time to crossing one of roadway lines 3b, 3c as $t_{LC}$ (time to line crossing). If $t_{LC}$ is sufficiently short, i.e., around $t_{LC} < t1$, where t1 is the time threshold value, the danger or probability of a lane departure is detected. To ascertain $t_{LC}$, the instantaneous distance of vehicle 1 from roadway lines 3b and 3c and the projected trajectory of vehicle 1 are ascertained, this trajectory being ascertained from the position of roadway lines 3b and 3c detected by camera 4 in relation to vehicle 1 and the driving dynamics data, i.e., transverse acceleration q and/or yaw rate ω as well as driving velocity v.

Navigation data on the upcoming course of lane 2b are also advantageously used. For this purpose, vehicle 1 has a navigation unit 22, which includes a GPS receiver 23, a map memory 24 for storing map data and also a control unit 25. Control unit 25 thus carries out a match mapping or a position detection in the map data and outputs corresponding information, in particular including a quality evaluation of the match mapping, as navigation signals S6 to control unit 10 via the CAN bus.

Control unit 10 of the LDW system may thus detect the departure from lane 2b as a function of the upcoming route or the upcoming course of lane 2b.

Control unit 10 is equipped with a function for detecting an intentional shortening of the trajectory. For this purpose, it may suppress the output of LDW signal S5 upon detecting a probable lane departure, i.e., in the case of $t_{LC}<t1$, if it determines that this lane departure is intentional and represents a non-dangerous shortening of the trajectory.

For this purpose, control unit 10 of the LDW system determines that a curve is located ahead of vehicle 1, i.e., the vehicle's own lane 2b as well as entire roadway 2 makes a curve, and the driver wishes to cut line 3b inside the curve, i.e., he wishes to cross the line temporarily completely or partially, since he will thus subsequently return completely to lane 2b due to his driving behavior.

According to FIG. 3, the method is started in step St0, e.g., upon starting the engine or upon detecting a driving velocity (v>0); camera signals S4 are subsequently recorded in step St1, and driving dynamics measuring signals S1, S2, S3 and possibly S7 are recorded in St2, steps St1 and St2 being carried out, in principle, simultaneously. According to Step St3, $t_{LC}$ is determined and compared in step St4 with time threshold value t1 according to lane change display criterion K0, so that, according to decision step St4, the method is either reset again prior to step St1 (branch n) or an imminent or already initiated lane departure is detected according to branch y.

However, if an imminent or already initiated lane departure is detected, i.e., $t_{LC} \geq t1$, LDW signal S5 is not yet immediately output. Instead, a check is initially made according to step St5 to see whether an intentional lane departure is present. For this purpose, the following decision criteria are checked:

K1: Curve criterion: Does lane 2b make a curve ahead of vehicle 1?

A check is advantageously made of whether a maximum curve radius (a minimum curvature) and/or a sufficiently long curve is present. An intentional shortening of the trajectory should therefore be detected only if a sufficiently small curve radius r3b of the vehicle's own lane 2b or of inner line 3b to be cut is present, i.e., a curve radius r3b below a threshold.

A crossing in a "slight" curve should preferably be prevented. Thus, active trajectory shortening maneuvers are also preferably prevented in which long, slight curves (little curvature) are cut by the driver.

K2: Quality criterion: Is an estimated quality of the map-matched position above a threshold? This means: Can the position of vehicle 1, which is ascertained from the GPS, be indicated in the map data with a sufficient degree of accuracy?

This quality criterion may also apply to the map data, e.g., due to the requirement that the map data not be older than a defined age. K1 thus relates to a quality criterion for the vehicle's own map-matched position and preferably also the quality of the determination of the roadway course of roadway 2 and the vehicle's own lane 2b ahead of vehicle 1;

if it may be assumed, in principle, that the quality of the map-matched position is sufficiently high, K2 may also be viewed as being implicitly fulfilled, while an error signal is generated for K2 when problems with the quality are indicated.

K3: Is a complete or partial lane departure to another lane imminent?

Is the vehicle changing to another lane or departing from roadway 2 entirely?

On a two-lane roadway 2, this question may thus be reduced to whether an inner curve is present: Is the line to be crossed within time $t_{LC}$ an inner line and thus line 3b according to FIG. 1? In right-hand traffic, a left-hand curve is therefore present (or a right-hand curve in the case of left-hand traffic).

However, if roadway 2 has more than two lanes, a reliable lane change may also occur on an outer curve (right-hand curve in right-hand traffic).

K2 may be answered from the map data and by detecting which roadway line is being crossed. In the case of right-hand traffic and two-lane roadway 2, for example, transverse acceleration signal S3 or yaw rate signal 92 are also sufficient since only left-hand curves are permitted.

K4: Active steering on the part of the driver: An intentional shortening of the trajectory (cutting curves) should be possible only if actively performed by the driver. For this purpose, a steering angle signal S7 which indicates a steering angle above a threshold and thus a steering maneuver is sufficient, e.g., if a steering angle sensor 30 is provided.

If no steering angle sensor is present, the active steering may also be ascertained from transverse acceleration signal S3 and/or yaw rate signal 92. Active steering is therefore carried out if the vehicle is steered by the driver using a turned steering angle, and thus a centrifugal force is measurable as transverse acceleration q and/or a yaw rate ω is measurable as the rotation around the vertical axis (yaw axis) above a threshold in each case. A further option for detecting active steering is to ascertain the trajectory of vehicle 1 relative to lane 2b, if a turn maneuver may be detected with a sufficient degree of accuracy therefrom.

Decision criteria K3 and K4 thus indicate that active steering of vehicle 1 against the centrifugal force is occurring, since inner line 3b in the curve is crossed by active steering. In addition, other decision criteria may be included:

K5: Collision detection: A distance sensor which may be provided in vehicle 1 detects the driving area ahead of vehicle 1, e.g., on the basis of a radar, ultrasonic or stereo camera; the detection area also covers parts of left-hand lane 2a due to the slanted position of vehicle 1 during the trajectory shortening maneuver. Control unit 10 may detect a possible collision with an oncoming vehicle in the presence of such distance signals S8 of a distance sensor 30. Upon detecting a possible collision of this type in left-hand lane 2a being crossed by the trajectory shortening maneuver, the output of LDW signal S5 is not suppressed, and additional warning signals or driving dynamics interventions may be additionally output.

K6: Traction quality: If control unit 10 detects or is informed via CAN bus 12 that poor roadway conditions or poor traction or a poor coefficient of friction μ is present, the suppression of the output of LDW signal S4 may be intentionally prevented. This is based on the idea that the trajectory shortening maneuver should be intentionally displayed under poor roadway conditions, since dangerous situations may arise should sudden corrections become necessary, for example in the event of oncoming vehicles, and the driver should therefore be aware of his risky driving behavior.

K7: Upcoming traffic situation: Is the traffic situation or traffic routing on the upcoming route too dangerous for a curve-cutting maneuver? Or are any traffic situations or traffic routing situations to be classified as dangerous, for example intersections, entries/on-ramps or roadway constrictions, located within a relevant upcoming route range of, e.g., 20 meters-100 meters ahead of the vehicle? For example, a curve-cutting maneuver before an intersection or junction may be classified as dangerous. If such a traffic situation deemed to be dangerous for a curve-cutting maneuver is detected from the map data, it may be provided that the output of LDW signal S5 is not suppressed. In addition to such possible dangerous situations which may be derived from map data, for example up-to-date traffic information, may also be evaluated in this case, for example notifications of a traffic jam and/or an accident in an upcoming route range ahead of the vehicle. In such cases as well, a dangerous, upcoming traffic situation may be detected and the output of LDW signal S5 may subsequently not be suppressed.

Decision criteria K5, K6 and K7 may additionally be used individually or in combination.

Of the driving dynamics signals, driving velocity signal S1 is also sufficient in principle, since the transverse acceleration may be ascertained, in principle, from this signal and known map data as well as a sufficient quality of the map-matched position. The additional recording of a steering angle signal and/or transverse acceleration signal S3 and/or yaw rate signal S2 is, however, advantageous.

Figure 3:
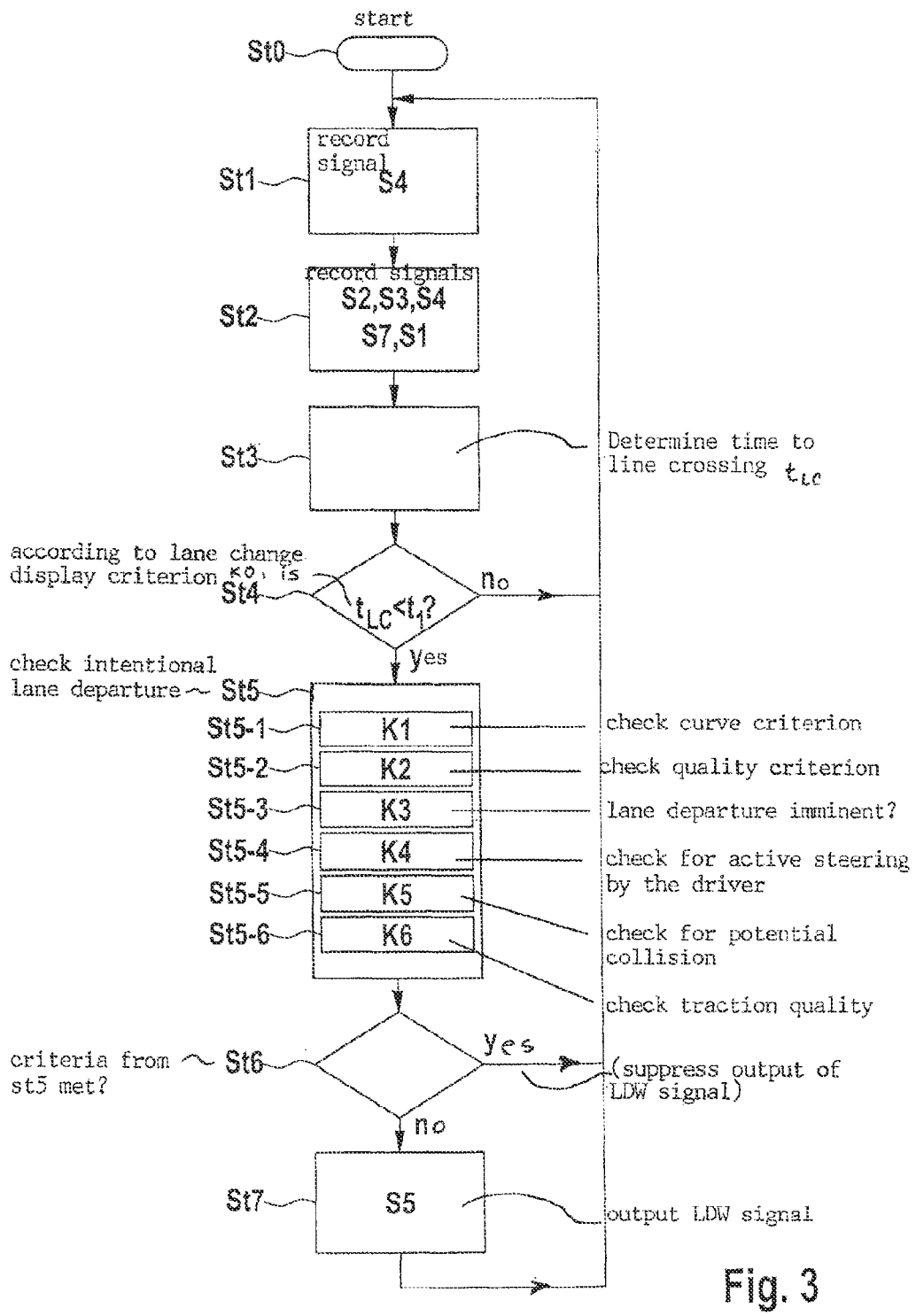
FIG. 3 shows a flow chart of the method according to the present invention.

According to the flow chart in FIG. 3, individual steps St5-1 through St5-7 are thus checked in step St5; the sequence of steps St5-1 through St5-3 is arbitrary; in particular, they may also be carried out in parallel. Additional criteria K5, K6 and K7 may also be additionally checked in a subsequent step if the check in K1 through K4 permitted, in principle, the suppression of the output of LDW signal S5.

In decision step St6, it is subsequently decided whether decision criteria K1 through K7 have been met; if they have been met, the output of LDW signal S5 is suppressed according to branch y, and the method is again reset to before step St1. If the criteria are not met, LDW signal S5 is subsequently output in step St7 according to branch n, and the method is reset to before step St1.

What is claimed is:

1. A lane monitoring method for a vehicle, comprising:
   detecting a lane of the vehicle with the aid of a camera located on the vehicle;
      wherein the camera is a rear view camera monitoring a detection area behind the vehicle; and
      based on output signals of the camera, (i) a course of roadway lines located behind the vehicle and which define the lane of the vehicle is ascertained, and (ii) a forward course of the lane of the vehicle is estimated by at least one of extrapolation and affirmation;
   recording at least one driving status measuring signal of the vehicle;
   evaluating a driving status of the vehicle according to at least one lane departure criterion; and
   generating a lane departure warning signal as a function of the evaluation of the driving status according to the lane departure criterion;
   wherein, if the lane departure criterion is met, a determination is made whether at least one decision criterion for detecting an intentional trajectory shortening maneuver has been met, and if an intentional trajectory shortening maneuver is detected, an output of the lane departure warning signal is prevented.

2. The method as recited in claim 1, wherein the intentional trajectory shortening maneuver is detected when at least one of the following decision criteria is met:
   a first decision criterion, according to which the lane of the vehicle makes a curve ahead of the vehicle;
   a second decision criterion, according to which an estimated quality of a position determination of the vehicle from a position determining system and map data is above a predefined threshold;
   a third decision criterion, according to which a likely future at least partial crossing of a roadway line of the lane of the vehicle to another lane of the roadway is detected in the evaluation according to the lane departure criterion; and
   a fourth decision criterion, according to which an active steering by the driver is detected.

3. The method as recited in claim 2, wherein the intentional trajectory shortening maneuver is detected when the first, second, third and fourth decision criteria have been met.

4. The method as recited in claim 2, wherein, in connection with the third decision criterion, a determination is made whether the roadway line which is likely to be at least partially crossed by the vehicle is a line located inside the curve ahead of the vehicle.

5. The method as recited in claim 2, wherein the active steering by the driver is detected from the at least one driving status measuring signal of the vehicle.

6. The method as recited in claim 5, wherein at least one of the following driving status measuring signals is used to detect the active steering:
   a steering angle signal which indicates a steering angle above a predefined threshold;
   a transverse acceleration signal which indicates one of a transverse acceleration or centrifugal force above a predefined threshold;
   a yaw rate signal which indicates a yaw rate of the vehicle above a predefined threshold; and
   a driving velocity signal, wherein a turn maneuver is detected based on a combination of the driving velocity signal and output signals of the camera.

7. The method as recited in claim 2, wherein, in connection with the first decision criterion, a determination is made whether the course of the lane of the vehicle ahead of the vehicle has at least one of a curve radius below a predefined threshold and a curve length above a predefined minimum longitudinal extension.

8. The method as recited in claim 2, wherein the intentional trajectory shortening maneuver is detected when at least one of the following additional decision criteria is additionally met:
   a fifth decision criterion, according to which no collision warning with an object is provided for an instantaneous trajectory of the vehicle in the case the vehicle has one of a collision warning system or a distance detecting system;
   a sixth decision criterion, according to which one of a roadway surface or a coefficient of friction of the vehicle in the lane is evaluated as being sufficiently good; and
   a seventh decision criterion, according to which an upcoming traffic situation is classified as not dangerous based on at least one of map data and traffic information.

9. The method as recited in claim 1, wherein, in connection with the lane departure criterion, at least one of a probability and a point in time of a departure from the lane by the vehicle is checked.

10. The method as recited in claim 2, wherein the at least one lane departure criterion and at least one of the first through fourth decision criteria form an overall lane departure criterion, and the lane departure warning signal is output if the at least one lane departure criterion is met and the at least one of the first through fourth decision criteria is not met.

11. A control unit for a lane monitoring system of a vehicle, comprising:
   a recording unit configured to record at least one driving status measuring signal of the vehicle and output signals of a camera of the vehicle which monitors a detection area outside the vehicle
      wherein the camera is a rear view camera monitoring a detection area behind the vehicle; and
   an evaluation unit configured to (i) evaluate a driving status of the vehicle according to at least one lane departure criterion, based on the at least one driving status measuring signal and the output signals of the camera, (ii) output a lane departure warning signal as a function of the evaluation according to the at least one lane departure criterion, (iii) ascertain, based on output signals of the camera, a course of roadway lines located behind the vehicle and which define the lane of the vehicle is, and (iv) to estimate by at least one of extrapolation and affirmation and based on output signals of the camera, a forward course of the lane of the vehicle;
   wherein, if the lane departure criterion is met, the control unit checks whether at least one decision criterion for detecting an intentional trajectory shortening maneuver has been met, and the output of the lane departure warning signal is suppressed if the intentional trajectory shortening maneuver is detected.

12. The control unit as recited in claim 11, wherein, in connection with the lane departure criterion, at least one of a probability and a point in time of a departure from the lane by the vehicle is checked.

13. A lane monitoring system of a vehicle, comprising:
   a rear view camera mounted on the vehicle and monitoring a detection area outside the vehicle and outputting camera signals; and
   a control unit including:
   a recording unit configured to record at least one driving status measuring signal of the vehicle and the output camera signals of the camera of the vehicle
      wherein the camera is a rear view camera monitoring a detection area behind the vehicle; and
   an evaluation unit configured to (i) evaluate a driving status of the vehicle according to at least one lane departure criterion, based on the at least one driving status measuring signal and the output signals of the camera, (ii) output a lane departure warning signal as a function of the evaluation according to the at least one lane departure criterion, (iii) ascertain, based on output signals of the camera, a course of roadway lines located behind the vehicle and which define the lane of the vehicle is, and (iv) to estimate by at least one of extrapolation and affirmation and based on output signals of the camera, a forward course of the lane of the vehicle;
   wherein, if the lane departure criterion is met, the control unit checks whether at least one decision criterion for detecting an intentional trajectory shortening maneuver has been met, and the output of the lane departure warning signal is suppressed if the intentional trajectory shortening maneuver is detected.

14. A lane monitoring method for a vehicle, comprising:
   detecting a lane of the vehicle with the aid of a camera located on the vehicle;
   recording at least one driving status measuring signal of the vehicle;
   evaluating a driving status of the vehicle according to at least one lane departure criterion; and
   generating a lane departure warning signal as a function of the evaluation of the driving status according to the lane departure criterion;
   wherein, if the lane departure criterion is met, a determination is made whether at least one decision criterion for detecting an intentional trajectory shortening maneuver has been met, the at least one decision criterion being whether an estimated quality of a position determination of the vehicle from a position determining system and map data is above a predefined threshold, wherein the estimated quality of the position determination of the vehicle is a degree of accuracy with which the position of the vehicle is able to be indicated in the map data, and if an intentional trajectory shortening maneuver is detected, an output of the lane departure warning signal is prevented.

15. A lane monitoring method for a vehicle, comprising:
   detecting a lane of the vehicle with the aid of a camera located on the vehicle;
   recording at least one driving status measuring signal of the vehicle;
   evaluating a driving status of the vehicle according to at least one lane departure criterion; and
   generating a lane departure warning signal as a function of the evaluation of the driving status according to the lane departure criterion;
   wherein, if the lane departure criterion is met, a determination is made whether at least one decision criterion for detecting an intentional trajectory shortening maneuver has been met, and if an intentional trajectory shortening maneuver is detected, an output of the lane departure warning signal is prevented; and
   wherein the intentional trajectory shortening maneuver is detected when at least one of the following decision criteria is met:
      a first decision criterion, according to which the lane of the vehicle makes a curve ahead of the vehicle; and
      a second decision criterion, according to which an estimated quality of a position determination of the vehicle from a position determining system and map data is above a predefined threshold, wherein the estimated quality of the position determination of the vehicle is a degree of accuracy with which the position of the vehicle is able to be indicated in the map data.

16. A lane monitoring method for a vehicle, comprising:
   detecting a lane of the vehicle with the aid of a camera located on the vehicle;
   recording at least one driving status measuring signal of the vehicle;
   evaluating a driving status of the vehicle according to at least one lane departure criterion; and
   generating a lane departure warning signal as a function of the evaluation of the driving status according to the lane departure criterion;
   wherein, if the lane departure criterion is met, a determination is made whether at least one decision criterion for detecting an intentional trajectory shortening maneuver has been met, and if an intentional trajectory shortening maneuver is detected, an output of the lane departure warning signal is prevented; and wherein the intentional trajectory shortening maneuver is detected when at least one of the following decision criteria is met:

a decision criterion, according to which an estimated quality of a position determination of the vehicle from a position determining system and map data is above a predefined threshold, wherein the estimated quality of the position determination of the vehicle is a degree of accuracy with which the position of the vehicle is able to be indicated in the map data; and another decision criterion, according to which a likely future at least partial crossing of a roadway line of the lane of the vehicle to another lane of the roadway is detected in the evaluation according to the lane departure criterion.

17. The method as recited in claim 15, wherein the intentional trajectory shortening maneuver is detected when the first and second decision criteria, along with the following decision criteria, are satisfied:

a third decision criterion, according to which a likely future at least partial crossing of a roadway line of the lane of the vehicle to another lane of the roadway is detected in the evaluation according to the lane departure criterion; and a fourth decision criterion, according to which an active steering by the driver is detected.

* * * * *